United States Patent
Wooldridge

(10) Patent No.: US 10,430,612 B2
(45) Date of Patent: Oct. 1, 2019

(54) ELECTRONIC PREEMPTIVE EVIDENTIARY ESCROW PLATFORM

(71) Applicant: Joseph Bryan Wooldridge, Stanardsville, VA (US)

(72) Inventor: Joseph Bryan Wooldridge, Stanardsville, VA (US)

(*) Notice: Subject to any disclaimer, the term of this patent is extended or adjusted under 35 U.S.C. 154(b) by 7 days.

(21) Appl. No.: 15/084,219

(22) Filed: Mar. 29, 2016

(65) Prior Publication Data

US 2016/0300078 A1 Oct. 13, 2016

Related U.S. Application Data

(60) Provisional application No. 62/144,768, filed on Apr. 8, 2015.

(51) Int. Cl.
*G06F 21/62* (2013.01)
*G06F 21/31* (2013.01)
(Continued)

(52) U.S. Cl.
CPC .......... *G06F 21/6272* (2013.01); *G06F 21/31* (2013.01); *H04L 63/08* (2013.01);
(Continued)

(58) Field of Classification Search
CPC ...... G06F 21/60; G06F 21/62; G06F 21/6209; G06F 21/6218; G06F 21/6227; G06F 21/6272; G06F 21/31; G06Q 20/40; G06Q 30/0609; G06Q 20/02; G06Q 20/389; H04L 63/30; H04L 63/308; H04L 9/085; H04L 9/0894; H04L 63/08; H04L 63/102
See application file for complete search history.

(56) References Cited

U.S. PATENT DOCUMENTS

2002/0083210 A1* 6/2002 Harrison ............. G06F 17/3061
719/310
2006/0085314 A1* 4/2006 Grim, III ............... G06Q 30/02
705/35
(Continued)

FOREIGN PATENT DOCUMENTS

WO 2006069274 6/2006

OTHER PUBLICATIONS

Peppet, Prostitution 3.0, 98 Iowa L. Rev. 1989, pp. 1989-2060 (2013).*

*Primary Examiner* — Theodore C Parsons
(74) *Attorney, Agent, or Firm* — Rubvogel Law Office

(57) ABSTRACT

The system and method described herein provide mechanisms by which connected devices and/or internal subsets of devices can be used to implement an electronic preemptive evidentiary escrow platform. Such a platform can be used, for example, as a preemptive defensive mechanism to prevent unauthorized access to information, while permitting authorized access with a minimum of additional burden. A compound message is partitioned into public summary data and private detail media/metadata. The public summary data is made readily available, while the private data is only made available to authorized entities upon occurrence of predefined condition(s). In at least one embodiment, one or more hardware devices can be automatically reconfigured upon occurrence of predefined condition(s) to allow authorized access to private data.

47 Claims, 8 Drawing Sheets

(51) Int. Cl.
  *H04L 29/06* (2006.01)
  *G06Q 30/06* (2012.01)
  *G06Q 20/40* (2012.01)
  *G06Q 20/38* (2012.01)
  *G06Q 20/02* (2012.01)
  *H04L 9/08* (2006.01)

(52) U.S. Cl.
  CPC ........... *H04L 63/102* (2013.01); *G06Q 20/02* (2013.01); *G06Q 20/389* (2013.01); *G06Q 20/40* (2013.01); *G06Q 30/0609* (2013.01); *H04L 9/085* (2013.01); *H04L 9/0894* (2013.01)

(56) References Cited

U.S. PATENT DOCUMENTS

| | | | |
|---|---|---|---|
| 2007/0136821 A1 | 6/2007 | Hershaft et al. | |
| 2007/0253548 A1* | 11/2007 | Kameyama | G06F 21/6218 380/28 |
| 2008/0155262 A1 | 6/2008 | Beaver et al. | |
| 2009/0076944 A1* | 3/2009 | Brams | G06Q 20/10 705/37 |
| 2009/0116649 A1 | 5/2009 | Perlman | |
| 2009/0191840 A1* | 7/2009 | Piett | G06F 21/554 455/404.1 |
| 2011/0145593 A1* | 6/2011 | Auradkar | G06F 21/6218 713/189 |
| 2014/0019770 A1* | 1/2014 | Jung | G06F 21/602 713/189 |
| 2014/0115698 A1* | 4/2014 | Jogand-Coulomb | G06F 21/10 726/21 |

* cited by examiner

ELECTRONIC PREEMPTIVE EVIDENTIARY ESCROW PLATFORM

CROSS-REFERENCE TO RELATED APPLICATIONS

The present application claims the benefit of U.S. Provisional Application Ser. No. 62/144,768 for "Preemptive Evidentiary Escrow Platform", filed Apr. 8, 2015, which is incorporated herein by reference.

TECHNICAL FIELD

The present document relates to mechanisms for selectively sharing information across an electronic network in response to certain predefined condition(s).

BACKGROUND

For many people, cellular phones, tablet computers, personal digital assistants, and various other mobile computing devices are playing increasingly important functions in their everyday lives. More and more people, for instance, use mobile computing devices while at home, at work, at school, or while traveling, to create, analyze, organize, consume, and communicate all manner of digital content with various other users of such devices.

These interconnected communication systems and device enable users to create, share, and/or organize data between multiple users and/or groups of users.

Each day, people go through any number of trusted interactions with other people, many of who are strangers. Examples of these interactions include: getting into a taxicab; going on a first date; meeting a real estate agent to see a house; buying/selling goods over the Internet; taking a tour; renting a room in someone's house. In addition, people can observe strangers interacting in ways that might attract attention, such as a public arrest, or public bullying, or fighting. In most cases, such interactions proceed amicably and/or as expected, without undue incident. Occasionally, however, unforeseen events take place, for example if one party or the other breaches an agreement (explicit or unspoken), or acts in an unsavory or unexpected manner. When things do not end as expected, it is usually a case of bad intentions meeting an opportunity to proceed, and in many cases, to proceed without anyone else having knowledge of the scenario. In other words, bad actors are more likely to act if they believe they will not be caught.

A hypothetical, though impractical, method to hinder the development of crimes of opportunity would be to have the interacting parties put each other on notice and enter into a contract. They would come to terms about how their expected interaction should proceed. They would document the agreement. They would deposit the agreement with a trusted third party. Then after the interaction (if successful), they would contact the third party to indicate that the expectations had been met and the agreement could be expunged. This type of formal process could hinder the development of crimes of opportunity, principally because there would be documentation of the interaction. Individual parties would be put on notice that some minimal safe outcome, for example, was expected.

However, as a practical matter, such a process, as described, cannot generally be implemented because it takes too much time and trouble, and because it involves a possible third party. No one would do this for the many small, seemingly innocuous, interactions they have each day. In addition, personal privacy would be violated to varying degrees.

The current state of the art lacks a method to easily and quickly affect such transactions so as to ensure they take place as anticipated. There is currently no method or system of protocols and interactivity to allow for the rapid depositing of data, preemptively, to an escrow platform, from multiple device-independent users. In addition, there is no method to escrow data preemptively before any relevance of the data has been determined. And there is no method for a trusted solution to search data for future relevance. Furthermore, existing techniques generally provide no mechanism by which a party can be alerted or notified that data has been deposited on an escrow platform subject to future relevance. In short, there is no easy way to put someone on notice that an interaction has been documented, and may come under future review.

SUMMARY

According to various embodiments, the system and method described herein provide mechanisms by which connected devices and/or internal subsets of devices can be used to implement an electronic preemptive evidentiary escrow platform. Such a platform can be used, for example, as a preemptive defensive device to prevent unauthorized access to information, while permitting authorized access with a minimum of additional burden.

A typical escrow arrangement usually involves two entities, a trusted third party, and a document, held by the trusted third party, containing agreed-upon specifics that must be met. Once the agreed-upon specifics are met, the trusted third party can act on the document. Usually the specifics are agreed upon in advance, and itemized in the controlling document by the original two entities, along with (possibly) a stipulation of a deadline for them to be met. In essence, the escrow arrangement reflects an agreement by the two parties on some course of action, wherein a trusted third party monitors that the stipulated agreement is fulfilled. In addition, both parties are aware of the expectations of the other, and a timeframe of completion is usually specified.

Various embodiments of the described system and method provide automated mechanisms for implementing and facilitating escrow arrangements. In at least one embodiment, the described techniques avoid the need for a written contract, particularly when the nature of the interaction suggests that the interaction is common enough that, in many instances, a generic understanding can be assumed in place of a written contract.

In at least one embodiment, the described system can operate in connection with interactions that usually occur in the open public, so that one of the parties can put the other party on notice. Private data relevant to the interaction is preemptively deposited onto a trusted regulatory escrow system. In at least one embodiment, as long as the interaction between the parties proceeds with no consequences of concern, the private data is ignored and may eventually be dismissed or deleted from the system. However, if some future relevance to the event is determined, then the private data is automatically made available so that it can be acted upon by trusted (authorized) third parties, after the fact.

In at least one embodiment, the process by which the private data is made available under certain circumstances occurs automatically and without the control of the entities. Thus, in at least one embodiment, when private data is deposited into the escrow system, the data is no longer under the control of the depositing party, but rather is automatically made available to other parties in response to certain conditions. Essentially, in such an embodiment, the depositing party gives up the ability to manipulate, access, and/or otherwise control the private data once it has been deposited; however, such ability to perform these operations may be automatically granted to the depositing party and/or to others in response to certain conditions.

One illustrative example of an application of the described techniques is in the context of an interaction between a taxi driver and a paying customer. From the outset, there is nothing unusual about the expectations of either the taxi driver or the paying customer. In essence, the taxi driver agrees to safely take the customer to point 'A', at which time the customer pays for the transportation. Then the transaction is ended. Very little information is needed to document that such an interaction has taken place. A minimum amount of information might be, for instance, who the interacting parties are, when they interacted, where they interacted, and how they interacted. Most of this information is currently available on mobile devices, for example, in the form of cell numbers, GPS locations, timestamps, and pictures, video and/or audio information.

Using various methods described herein, the relevant (private) information concerning the transaction can be transmitted and deposited into an electronic regulatory escrow system as described herein. Condition(s) are specified, under which the private information is to be revealed or transmitted to some authorized entity. By placing the private information into the electronic preemptive escrow system in this manner, the system puts the transacting parties on notice that, by proceeding, they each have incurred a certain reasonable trust for a minimal safe outcome. Each party knows and understands, ahead of time, the function and regulatory nature of the electronic preemptive escrow system.

In at least one embodiment, once private data has been deposited in the electronic escrow system, no party can delete or modify the private data in any way. In at least one embodiment, there is a trusted, independent custodian of the escrowed private data, who may be able to search the private data to find instances of relevance, even though the relevance might not be known when the private data is deposited. If desired, the data could be forwarded to another independent (authorized) party which can act on the revealed data.

Accordingly, the described system and method provide techniques for easily and rapidly depositing and storing private data that may or may not have some future relevance to a current or future event. In many situations, it may be beneficial for interacting parties to know that the data is being put on deposit, because just knowing that the data is being preemptively put on deposit, can alter the outcome of the event in a beneficial way.

In at least one embodiment, the system is implemented using any number of individual devices and/or internal subsets of devices in connection with dedicated servers (systems), various types of communication systems (such as, for example, local network, Internet, near-field communications, and/or the like), and governing trusted procedures. In at least one embodiment, the system provides an adaptive service that includes a public and private element, as described in more detail below.

In at least one embodiment, the system can be implemented in the context of an improved alarm system; instead of merely protecting a fixed perimeter, the system can be configured so as to provide protection in any number of adaptive situations.

In addition, in at least one embodiment, the system need not rely on a fixed set of sensors; rather, additional sensors and/or devices can join together and provide more and different kinds of coverage.

In at least one embodiment, the system can be configured to provide future detection of a violation that need not currently exist. In addition, the system can be configured to provide the ability to recreate a violating instance after the fact.

Such an embodiment is merely one example of an implementation of the system. In other embodiments, the system can provide security in the sense of being able to log documents, understandings, or the like, and to recreate conditions if a future issue arises. In this manner, the system provides an adaptive, moving, enjoining, security documenting platform with backup and rerun features.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION

The various concepts, architectures, methods, and modes of operation described herein are intended as illustrative examples that can be implemented singly or in any suitable combination with one another. Some may be omitted and others included, as suitable for various embodiments. Accordingly, the following description and accompanying Figures merely set forth a subset of the possible embodiments, and are not intended to limit scope.

System Architecture

In at least one embodiment, the system is implemented in the context of a server-based file storage and management system, which users access via a client machine running a browser or other software. In other embodiments, the system can be implemented in any client/server environment, networked environment, distributed or peer-to-peer system, or on any standalone device.

According to various embodiments, the system can be implemented on any one or more electronic devices and/or internal subsets of devices equipped to receive, store, and present information. Such electronic devices may include, for example, a desktop computer, laptop computer, smartphone, tablet computer, smartphone/tablet ("phablet"), camera, wearable computing device, or the like.

Although the system is described herein in connection with implementations in a desktop computer or mobile computing device such as a smartphone or tablet, one skilled in the art will recognize that the techniques described herein can be implemented in other contexts, and indeed in any suitable device. Accordingly, the following description is intended to illustrate various embodiments by way of example, rather than to limit scope.

Figure 1:
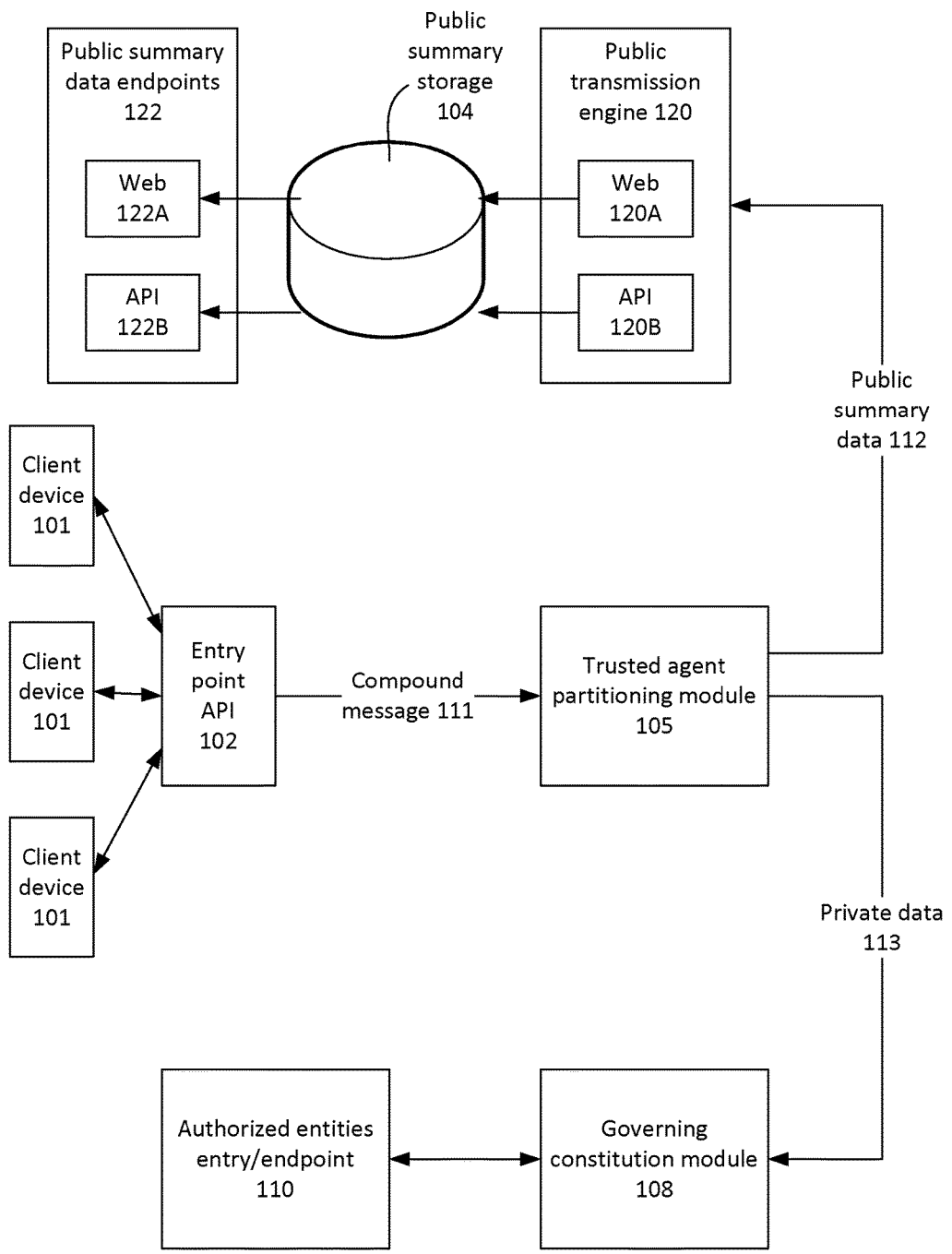
FIG. 1 is a block diagram depicting an overall architecture for an electronic preemptive evidentiary escrow platform according to one embodiment.

Referring now to FIG. 1, there is shown a block diagram depicting an overall architecture for an electronic preemptive evidentiary escrow platform according to one embodiment The system includes, for example, any number of client devices 101 (and/or internal subsets of devices), an entry point 102, a trusted agent partitioning module 105, a governing constitution module 108, entry/endpoints 110 for authorized entities, a public transmission engine 120, public summary storage 104, and public summary endpoints 122. The transmission engine 120 further includes a web transmission engine 120A and an application program interface (API) 120B. The public summary endpoints 122 further include a web endpoint 122A and an API endpoint 122B.

Figure 4:
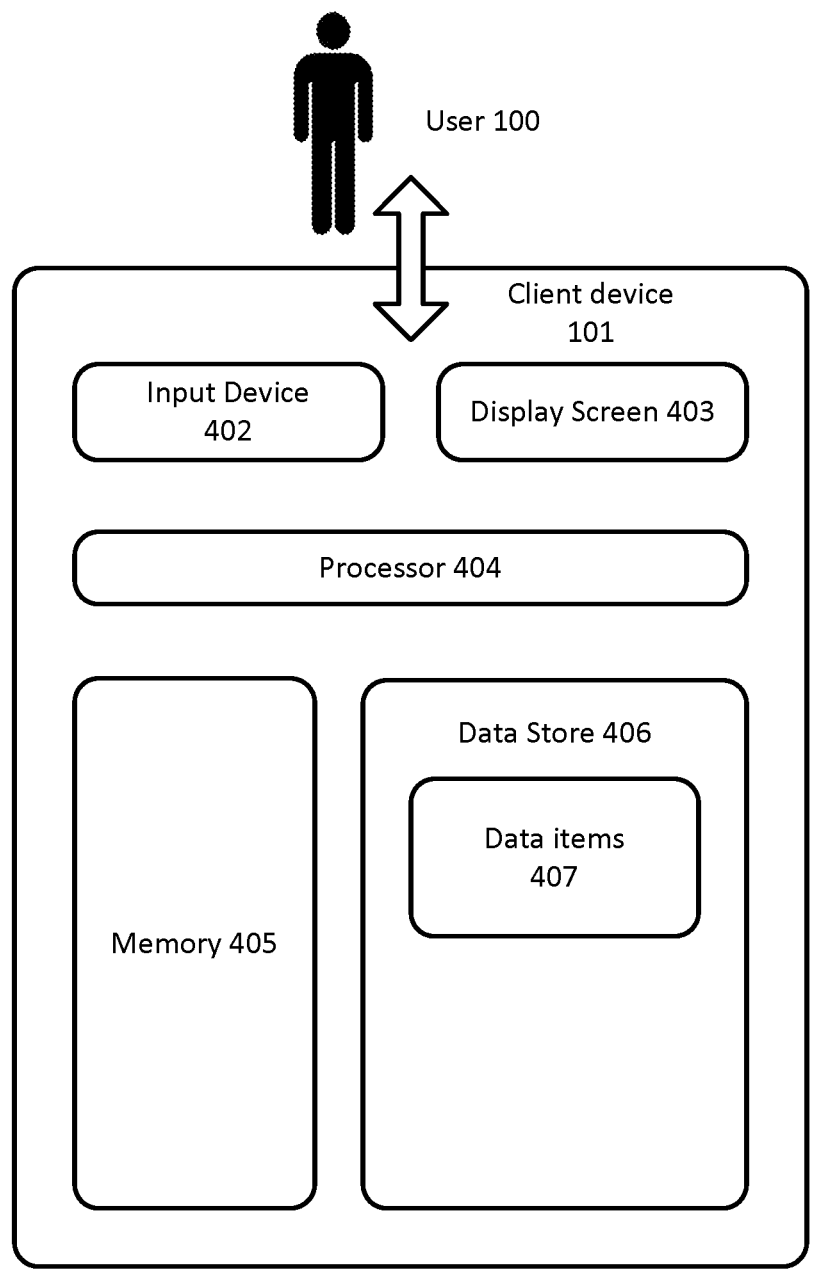
FIG. 4 is a block diagram depicting an example of a hardware architecture for a client device that can be used to implement an electronic preemptive evidentiary escrow platform, according to one embodiment.

Client devices 101 can be any suitable electronic devices and/or internal subsets of devices connected to an electronic communications network. Referring now also to FIG. 4, there is shown a block diagram depicting a hardware architecture for a client device 101 that can be used to implement an electronic preemptive evidentiary escrow platform, according to one embodiment. Device 101 may be any electronic device equipped to receive input and provide visual output, such as for example a computer, mobile device, tablet, kiosk, or other device 101.

In at least one embodiment, device 101 has a number of hardware components well-known to those skilled in the art. Input device 402 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Data store 406 can be any magnetic, optical, or electronic storage device (or devices) for data in digital form; examples include flash memory, magnetic hard drive, solid-state drive, CD-ROM, DVD-ROM, or the like; these can be memory-based, disk-based, volatile or non-volatile, online or off-line, remote or local, or any combination thereof. In at least one embodiment, data store 406 stores data items 407 that can be displayed, viewed, moved, deleted, and/or otherwise manipulated according to the techniques described below. Data items 407 may include, for example, files, documents, images, videos, animations, sound files, alerts, notifications, and/or any other type of data element that can be electronically stored. Data items 407 may include public and/or private data.

In at least one embodiment, data store 406 is organized in a file system. Appropriate indexing can be provided to associate data elements with each other. Data store 406 may include any of a wide variety of data structures known in the information storage arts, such as databases and other suitable data storage structures.

Data store 406 may be implemented in a database or using any other suitable arrangement. In another embodiment, data store 406 can be stored elsewhere, and retrieved by device 101 when needed for presentation to user 100. Thus, data store 406 can be local or remote with respect to the other components of device 101.

In at least one embodiment, device 101 is configured to retrieve data from a remote data storage device when needed. Such communication between device 101 and other components can take place wirelessly, by Ethernet connection, via a computing network such as the Internet, via a cellular network, or by any other appropriate means. This communication with other electronic devices is provided as an example and is not necessary.

In at least one embodiment, data store 406 is detachable in the form of a CD-ROM, DVD, flash drive, USB hard drive, or the like. Information can be entered from a source outside of device 101 into a data store 406 that is detachable, and later displayed after the data store 406 is connected to device 101. In another embodiment, data store 406 is fixed within device 101.

In at least one embodiment, data store 406 may be organized into one or more well-ordered data sets, with one or more data entries in each set. Data store 406, however, can have any suitable structure. Accordingly, the particular organization of data store 406 need not resemble the form in which information from data store 406 is displayed to user 100. In at least one embodiment, an identifying label is also stored along with each data entry, to be displayed along with each data entry.

Display screen 403 can be any element that graphically displays information such as data items 407 and user interface elements, for facilitation of operation of the escrow platform as described herein. In at least one embodiment where only some of the desired output is presented at a time, a dynamic control, such as a scrolling mechanism, may be available via input device 402 to change which information is currently displayed, and/or to alter the manner in which the information is displayed.

Processor 404 can be a conventional microprocessor for performing operations on data under the direction of software, according to well-known techniques. In at least one embodiment, processor 404 runs software for implementing a user interface and other components that includes the escrow functionality described herein.

Memory 405 can be random-access memory, having a structure and architecture as are known in the art, for use by processor 404 in the course of running software.

In at least one embodiment, functionality for implementing the escrow platform is implemented as a portion of memory 405, or as a data structure wherein pointers/references to particular locations in memory 405 and/or data store 406 are maintained.

Figure 5:
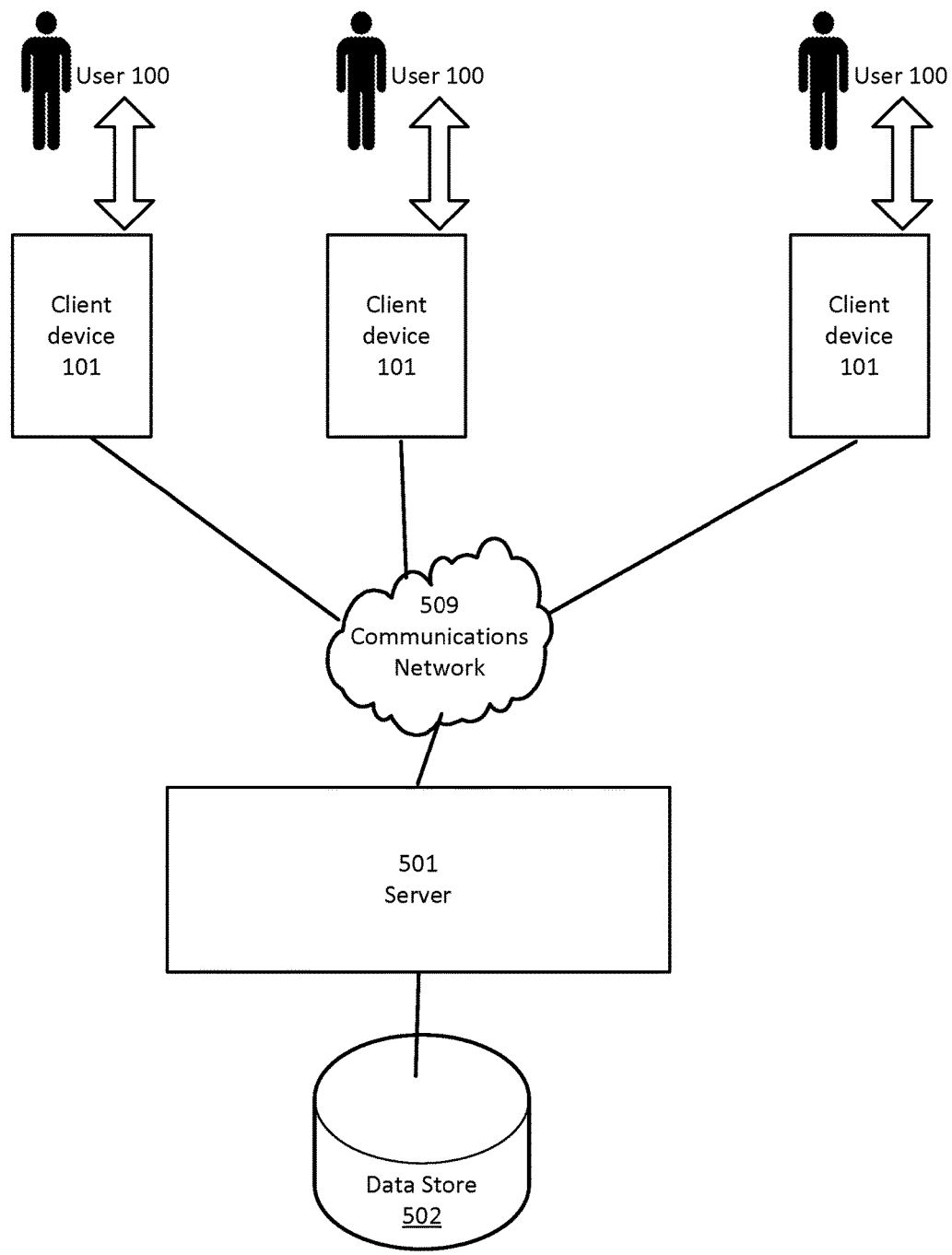
FIG. 5 is a block diagram depicting an example of a network architecture for implementing an electronic preemptive evidentiary escrow platform, according to one embodiment.

Referring now to FIG. 5, there is shown a block diagram depicting an example of a network architecture for implementing an electronic preemptive evidentiary escrow platform in a client/server arrangement, according to one embodiment. Any number of client devices 101 and/or internal subsets of devices can be provided. Each device 101 can be implemented using an architecture as depicted in FIG. 4; alternatively, other architectures are possible. In at least one embodiment, devices 101 communicate with server 501 via an electronic communications network 509.

The architecture depicted in FIG. 5 can use a "black box" approach, whereby data storage and processing are done completely independently from user input/output. An example of such a client/server environment is a web-based implementation, wherein each client device 101 runs a browser that provides a user interface for interacting with web pages and/or other web-based resources from server 501. Such web pages and/or other web-based resources, in connection with server resources, can provide the electronic escrow functionality described herein, allowing user 100 to interact with the escrow platform provided by the architecture and system described herein. In the course of such interactions, data items 407 and/or other information can be presented as part of such web pages and/or other web-based resources, using known protocols and languages such as Hypertext Markup Language (HTML), Java, JavaScript, and the like. In another embodiment, each client device 101 may be a mobile device, such as a smartphone, tablet, or camera, and an application ("app") installed on device 101 may implement the escrow features of the described system.

Any suitable type of communications network 509, such as the Internet, can be used as the mechanism for transmitting data between client devices 101 and server 501, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client devices 101 transmit requests for data via communications network 509, and receive responses from server 501 containing the requested data.

In this implementation, server 501 is responsible for data storage and processing, and interacts with centralized data store 502 for storing information. Data store 502 can be any magnetic, optical, or electronic storage device (or devices) for data in digital form; examples include flash memory, magnetic hard drive, solid-state drive, CD-ROM, DVD-ROM, or the like; these can be memory-based, disk-based, volatile or non-volatile, online or off-line, remote or local, or any combination thereof. Server 501 may include additional components as needed for retrieving data from data store 502 in response to requests from client devices 101. A single server 501 may be provided; alternatively, multiple servers 501 may be provided, either at the same location or at different locations. Different functions and/or modules can be implemented at the different servers 501; alternatively, there may be overlap between the functions performed by different servers 501, so as to provide improved redundancy, reliability, and/or performance.

As described above in connection with FIG. 4, in at least one embodiment, data store 502 may be organized into one or more well-ordered data sets, with one or more data entries in each set. Data store 502, however, can have any suitable structure. Accordingly, the particular organization of data store 502 need not resemble the form in which information from data store 502 is displayed to users 100. In at least one embodiment, an identifying label is also stored along with each data entry, to be displayed along with each data entry.

In at least one embodiment, data store 502 is organized in a file system. Data store 502 may include any of a wide variety of data structures known in the information storage arts, such as databases and/or other suitable data storage structures.

Further, in some embodiments, data may be distributed among multiple physical data stores 502. The depiction of a single data store 502 is intended to be illustrative, but not limiting. Thus, the server 501 and data store 502 of FIG. 5 may represent one or more physical devices, which may communicate with each other via the communications network 109 and/or one or more other networks (not shown).

In at least one embodiment, some or all of the system components can be implemented as software written in any suitable computer programming language, whether in a standalone or client/server architecture. Alternatively, system components may be implemented and/or embedded in hardware.

In at least one embodiment, components 102, 105, 110, 108, 122, and 120 (as depicted in FIG. 1) can be implemented in one or more servers such as server 501. Public summary storage 104 can be implemented in one or more data stores such as data store 502. Communication among modules can be performed via network 509 and/or via any other suitable electronic communications means. One skilled in the art will recognize, however, that other arrangements are possible.

Method

Figure 6:
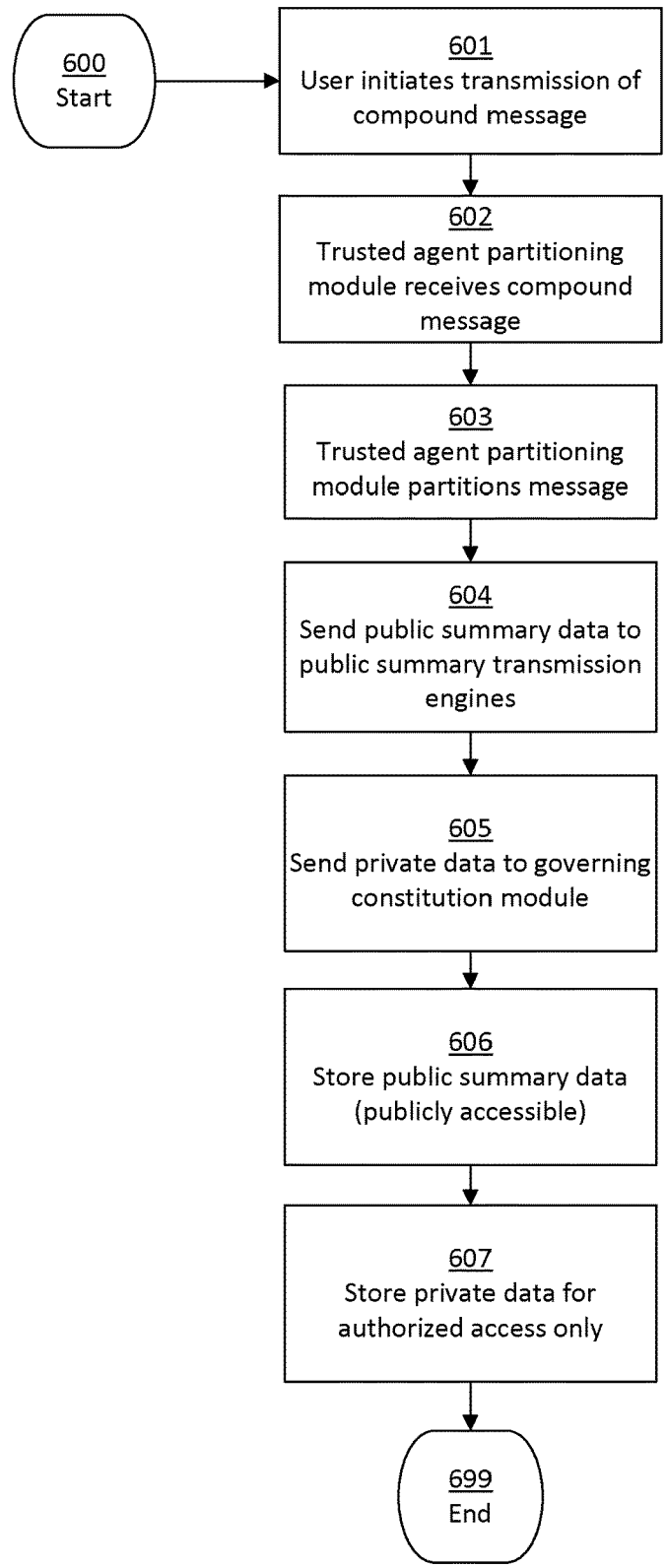
FIG. 6 is a flow diagram depicting a method for implementing and using an electronic preemptive evidentiary escrow platform, according to one embodiment.

Referring also to FIG. 6, there is shown a flow diagram depicting a method for implementing and using an electronic preemptive evidentiary escrow platform, according to one embodiment. The method of FIG. 6 can be implemented using an architecture such as that of FIG. 1, or using another suitable architecture. For descriptive purposes, the components depicted in FIG. 1 will be referenced in the description below.

The method begins 600. In at least one embodiment, user 100 initiates 601 transmission of a compound message 111 to entry point 102, using any suitable interface or control on client device 101. For example, user 100 can push a button, initiate a command, tap a user interface widget, or perform some other operation on device 101 to initiate 601 transmission of compound message 111.

Entry point 102 can be any interface element or control, for example created through an Application Program Interface (API) on device 101. In at least one embodiment, entry point 102 is implemented as an application program that allows user 100 to initiate, by some single mode of operation, the transmission of compound message 111. Compound message 111 may include, for example, an image, video item, audio item, text item, or other data item, along with other data that device 101 is capable of transmitting. Any suitable metadata can be included, such as for example, time stamp information, GPS location information, cell phone number information, and/or other embedded device-identifying data. In at least one embodiment, device 101 and API can indicate that transmission of compound message 111 has occurred, for example by an audible signal or by other means.

In at least one embodiment, compound message 111 can be generated in response to user input, such as pressing of a hardware button on the device, or pressing on a section of a touch-sensitive screen. Alternatively, compound message 111 can be generated automatically in response to some detected condition such as the device being dropped or thrown, or in response to a detected environmental condition such as a scream, voice recognition, or electrical detection by near field communications of a nearby device.

Trusted agent partitioning module 105 receives 602 compound message 111 from entry point 102, and partitions 603 message 111 into two or more pieces, including public summary data 112 and private data 113. In at least one embodiment, some of the message pieces (referred to as public summary data 112) are sent 604 in summary form to public summary transmission engines 120. Public summary transmission engines 120, including for example a web transmission engine 120A and/or an application programming interface (API) 120B, store public summary data 112 in public summary storage 104. Public summary endpoints 122 can be provided for accessing public summary data 112 on public summary storage 104; including for example a web endpoint 122A (such as a URL) and/or an API endpoint 122B (such as an identifier usable by an app).

In at least one embodiment, trusted agent partitioning module 105 can embed a unique transaction key into all the transaction pieces; in this manner, even though the various partitions may be sent to different places, they can easily be reassembled by linking the unique transaction keys.

In at least one embodiment, trusted agent partitioning module 105 can embed a time-lapse key that causes data to be retained for up to a certain fixed amount of time, after which the data is automatically deleted.

In at least one embodiment, public summary data 112 includes general "when" and "where" information, which can include, for example, approximations of the metadata describing user device 101. Under the direction of public governance module 204 and public summary translation module 206, public data is translated and stored 606 in a manner that is publicly accessible.

Private data 113, which may include detail media data and/or embedded metadata, is sent 605 to governing constitution module 108. In at least one embodiment, private data 113 is encrypted by some means that require one or more keys from one or multiple entities. Under the direction of private governance module 212 and private summary translation module 214, private data is translated and stored 607 in a manner that is available for authorized access only (and only after one or more predefined condition(s) have been met).

In at least one embodiment, once trusted agent partitioning module 105 has partitioned 603 compound message 111, users 101 only have access to public summary data endpoints 122. Private data 113 is not accessible or modifiable by users 101. As described above, such private data 113 may be made available only to authorized entities via endpoint 110 in response to certain predefined condition(s). Governing constitution module 108 controls the access to such private data 113 via endpoint 110, including detecting condition(s) to allow authorized entities to have access to private data 113. Examples of mechanisms by which endpoint 110 allows access to private data 113 include via webpage and/or hard copy.

In at least one embodiment, governing constitution module 108 grants access to authorized entities (via endpoint 110) after one or more predefined condition(s) have been detected. The predefined condition(s) can be of any type. In at least one embodiment, the predefined condition(s) are automatically detected. In another embodiment, they may be determined based on user input. In yet another embodiment, they may be determined based on some type of received signal. Examples of predefined conditions include: breach of an agreement; loss of an item; theft of an item; or the like. The predefined condition(s) can be trigger events that happen suddenly or instantaneously, or they can be condition(s) that arise over time and can be initiated or detected by any suitable means. Regardless of the specific type of predefined condition(s), in at least one embodiment, in response to the predefined condition(s), in at least one embodiment the system can automatically notify authorized entities that the condition(s) have been satisfied and that the entities now have access to private data 113. A link or other mechanism for accessing private data 113 can accompany the notification. The notification can be sent using any suitable means of communication, such as for example an app alert, email message, text message, audio message, voice call, and/or the like.

Thus, as mentioned above, in at least one embodiment, private data 113 is made available under certain circumstances automatically and without the control of the entities. Thus, in at least one embodiment, once private data 113 has been deposited into the escrow system, private data 113 is no longer under the control of the depositing party, but rather is automatically made available to other parties in response to certain conditions.

Figure 2:
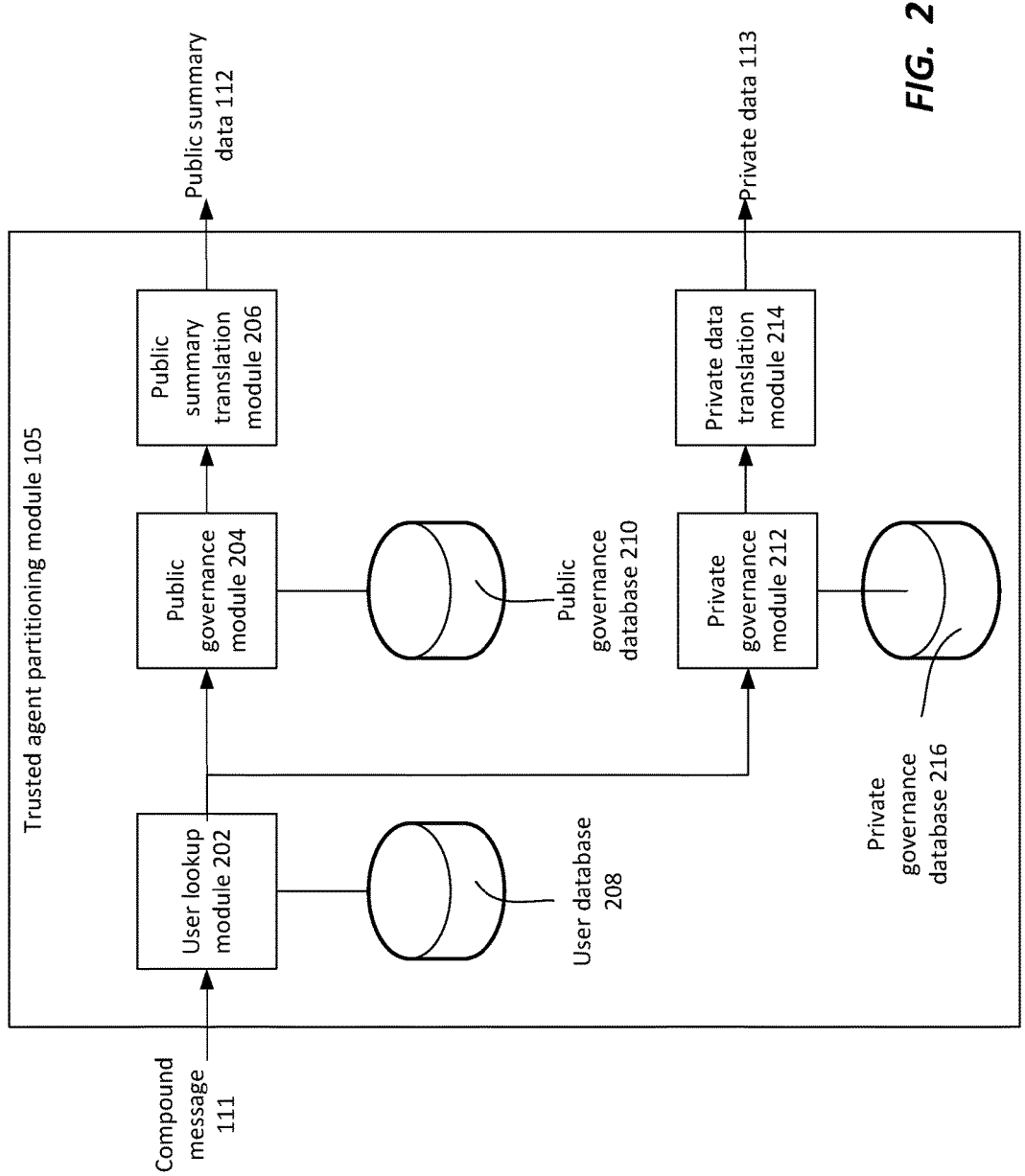
FIG. 2 is a block diagram depicting an architecture for a trusted agent partitioning module in an electronic preemptive evidentiary escrow platform, according to one embodiment.

Referring now to FIG. 2, there is shown an architecture for trusted agent partitioning module 105, according to one embodiment. Any or all of the components of module 105 can be implemented on one or more servers, such as server 501 and/or one or more data stores, such as data store 502.

In at least one embodiment, trusted agent partitioning module 105 includes a user lookup module 202 for looking up user information, a user database 208 for storing user information, a public governance module 204 for looking up public governance information, a public governance database 210 for storing public governance information, a public summary translation module 206 for translating public summary information, a private governance module 212 for looking up private governance information, a private governance database 216 for storing private governance information, and a private data translation module 214 for translating private data.

Figure 7:
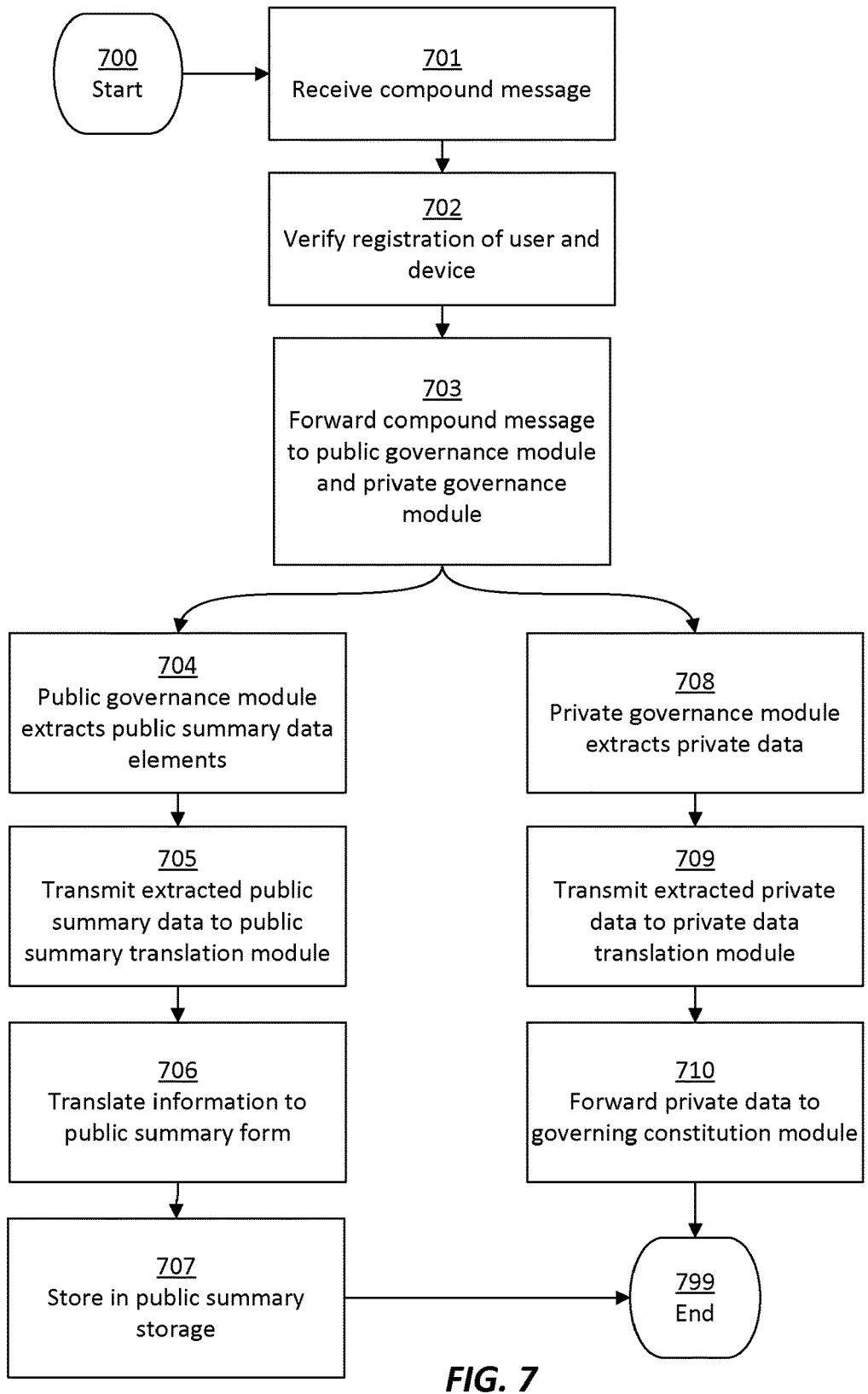
FIG. 7 is a flow diagram depicting a method of operation for a trusted agent partitioning module, according to one embodiment.

Referring also to FIG. 7, there is shown a flow diagram depicting a method of operation for trusted agent partitioning module 105, according to one embodiment. User lookup module 202 receives 701 compound message 111 from entry point 102. User lookup module 202 verifies 702, based on information in user database 208, that user 100 who initiated compound message 111 is a registered user and that device 101 at which compound message 111 was initiated is a registered device.

User lookup module 202 forwards 703 compound message 111 to both public governance module 204 and private governance module 212. Public governance module 204 looks up information for registered device 101 and extracts 704 public summary data elements 112. In at least one embodiment, module 204 determines the location and encoding for such data elements 112 by consulting public governance database 210.

Once the public summary data 112 has been extracted, it is transmitted 705 to public summary translation module 206, where the information is translated 706 into public summary form. Such public summary data 112 can include, for example, time stamp information and/or GPS coordinate location information embedded as metadata by user device 101. In other embodiments, other data can be included in public summary data 112. Once public summary translation module 206 has translated 706 and summarized the information, it is stored 707 in public summary storage 104. Data in public summary storage 104 can be viewed at web endpoints 122A and/or API endpoints 122B.

User lookup module 202 also forwards compound message 111 to private governance module 212. Private governance module 212 extracts 708 private data 113, such as metadata and/or detail media. In at least one embodiment, module 212 determines the location and encoding for such data 113 by consulting private governance database 216. In at least one embodiment, private data 113 can be translated into categories such as "who", "what", "when", and "where". In at least one embodiment, private data 113 can be a combination of metadata embedded by device 101 and media data that user 100 has selected. In other embodiments, other types of private data 113 can be used. In at least one embodiment, private data 113 is not generalized, but is as specific as the detail of device 101 can provide. In at least one embodiment, for example, the "who" information can be a cell phone number, the "what" information can be a short burst of video information, the "when" information can be the live time stamp embedded by the user device, and the "where" information can be specific GPS location coordinated also embedded by the user device, at the time the video was captured.

Once the private data has been extracted, it is transmitted 709 to private data translation module 214, which forwards 710 it to governing constitution module 108. In at least one embodiment, users and the public cannot see, edit, or delete private data 113 under normal conditions. However, such private data 113 may be provided to authorized entities in response to certain conditions, such as for example a breach of an agreement, commission of a crime, and/or the like. In at least one embodiment, private data translation module can be implemented as an offline server that accepts data elements but has no public inquiry access.

Figure 3:
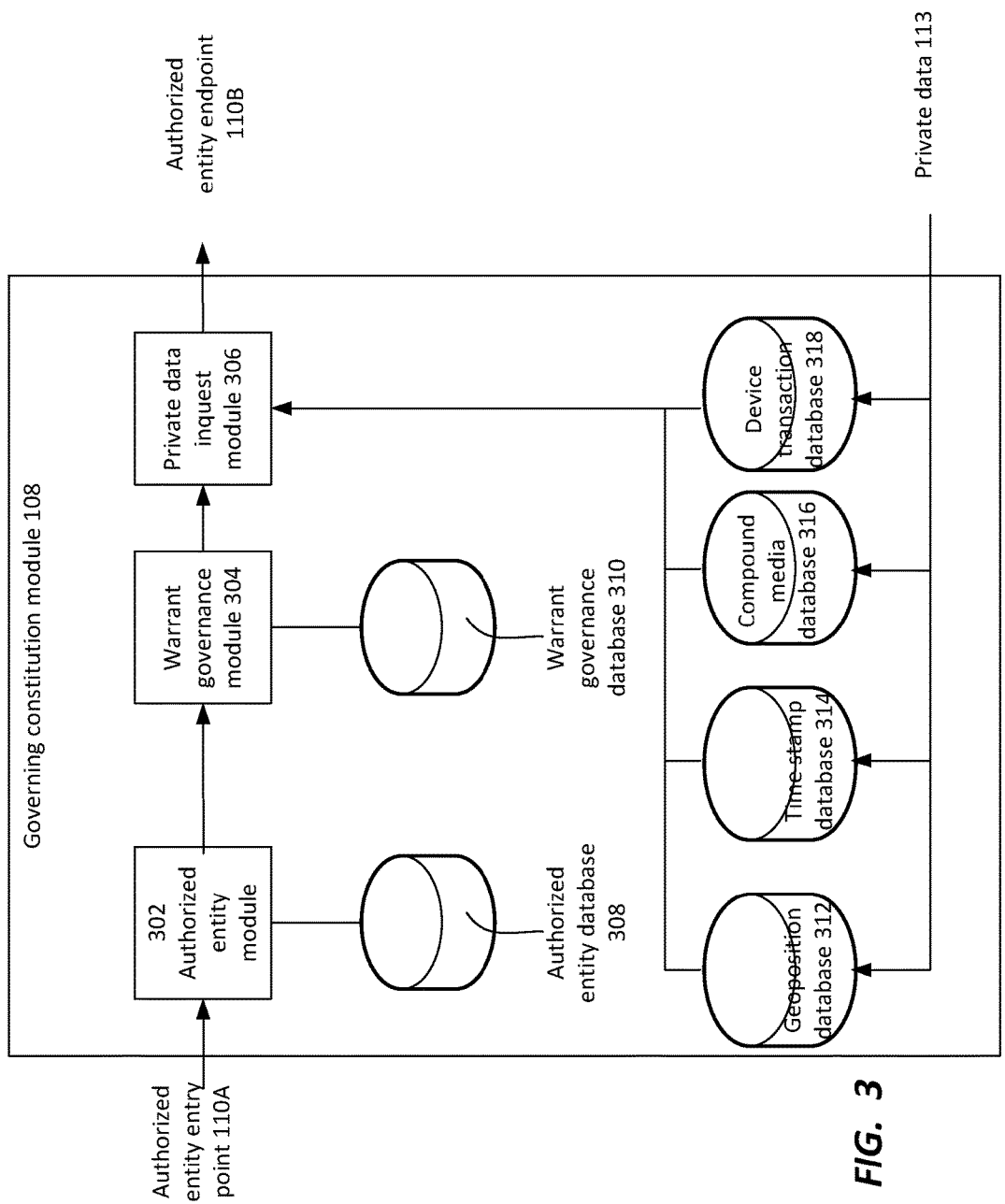
FIG. 3 is a block diagram depicting an architecture for a governing constitution module in an electronic preemptive evidentiary escrow platform, according to one embodiment.

Referring now to FIG. 3, there is shown an architecture for a governing constitution module 108, according to one embodiment. Any or all of the components of module 108 can be implemented on one or more servers, such as server 501 and/or one or more data stores, such as data store 502.

In at least one embodiment, governing constitution module 108 includes an authorized entity module 302 for looking up authorized entity information, an authorized entity database 308 for storing authorized entity information, a warrant governance module 304 for looking up warrant governance information, a warrant governance database 310 for storing warrant governance information, a private data inquest module 306 for obtaining private metadata and/or media data, a geoposition database 312 for storing geoposition information of devices 101, a time stamp database 314 for storing time tracking information, a compound media database 316 for storing compound media, and a device transaction database 318 for storing information about device transactions.

In at least one embodiment, warrant governance information includes information used to define the process and/or rules by which access is granted to data. Different processes and/or rules can apply to different situations. In some cases, laws or federal laws can determine how access is granted; in other situations, individuals and/or entities can specify under what conditions access should be granted.

Compound media can include any relevant data, such as for example, location, biometric data (fingerprints, voice recognition prints, and the like), serial numbers, digital signature recognition, and/or the like.

In at least one embodiment, the types of authorized entities that are permitted to communicate with governing constitution module 108, and the conditions (which may include trigger events) under which such communication (and release of private data 113) is permitted, are defined in governing constitution module 108. Authorized entity entry point 110A and endpoint authorized entity endpoint 110B can be implemented using a web interface; alternatively, any other mechanism can be used for providing access to private data 113, including for example a hard copy interface. In various embodiments, authorized entities can include, for example, legal representatives of the user 100 and/or other recognized legal entities (such as local police, FBI, and/or other governing authorities) that might have a permitted reason, as defined by governing constitution module 108, to communicate with the system and to access private data 113. In at least one embodiment, authorized entities are registered with the platform, and information describing such entities is stored in authorized entity database 308.

Figure 8:
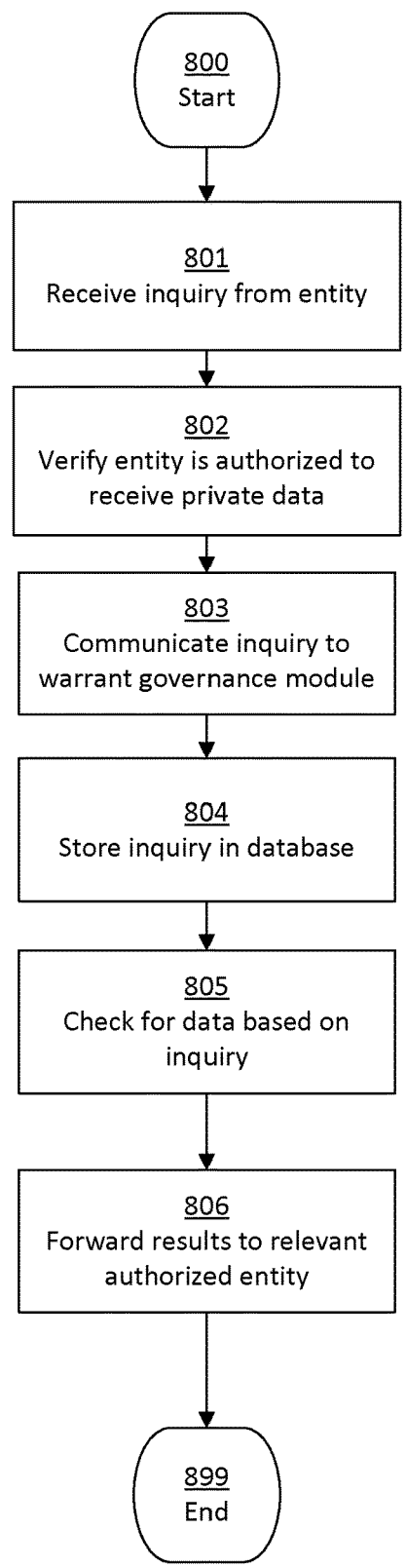
FIG. 8 is a flow diagram depicting a method for granting access to an authorized entity, according to one embodiment.

Referring also to FIG. 8, there is shown a flow diagram depicting a method for granting access to an authorized entity, according to one embodiment. In at least one embodiment, the authorized entity must present some agreed-upon or predetermined form of inquiry as determined by the governing constitution module 108, before being granted access to private data 113. The inquiry is received 801. The system then verifies 802, using authorized entity database 308, that the entity is authorized to receive private data 113. This can include determining whether any relevant predefined condition(s) for providing private data 113 have been satisfied. If so, the inquiry is communicated to warrant governance module 304 of governing constitution module 108, which stores 804 the inquiry in warrant governance database 310.

In at least one embodiment of the invention, the form of inquiry can be a preliminary inquiry for relevance regarding electronic data in time stamp database 314, geoposition database 312, device transaction database 318, compound media database 316, and/or any suitable combination thereof.

Private data inquest module 306 checks whether there is any relevant private data 113 based on the inquiry. Data 113 can be available, for example, if certain conditions have been met. The specific conditions can vary according to the particular implementation. The results of valid inquiries, if any, are forwarded 806 by private data inquest module 306 to the relevant authorized entities 110.

In at least one embodiment of the invention, the users 101, once registered, can be allowed free access to the platform. The public summary endpoints 122 can be coupled with advertisements. Authorized entity endpoints 110 can be fee-based. Other arrangements are possible.

Variations

In at least one embodiment, the system and method described herein facilitates management of multiple client/server platforms having different feature sets, client types, and/or server types.

More particularly, in at least one embodiment, an interaction of a client device with a server can make available a public summary that allows users to view summary information such as time and summary GPS location, but not detail information such as device identifiers, pictures, video, or audio, for example.

In at least one embodiment, the interaction of a client device with a server can generate a device feedback server that allows other registered devices monitoring the feedback server to adjust their settings, such as field of view, or alert another device. For example, in at least one embodiment, if a client device initiates a trigger event to deposit information on a platform, then other devices can monitor public summary data and make adjustments to their settings based on their capabilities. For example, a device that is a camera can detect that an event has happened near its field of view. In response, the device can automatically alter its settings to zoom in or out, or to change its field of view. In addition, the device can be configured to automatically initiate a deposit transaction onto a platform. In addition, another device can provide illumination functionality and/or warnings, which can be automatically activated if it detects a relevant trigger event on the nearby public summary server. In this manner, a device can extend its capabilities by informing other devices in the area to perform certain actions, and also to initiate a transaction on the platform. This functionality thus allows the system to grow in capability by combining functionality with other devices.

In at least one embodiment, the interaction of a device with a server is transmitted to a private log server that stores the private details of an incoming transaction. For example, based on a trigger event, a device can automatically initiate a deposit of data. Such data can be stored on device transaction database 318 and/or other components such as databases 312, 314, and 316.

In at least one embodiment, trusted agent partitioning module 105 operates using a device/server model; thus, rather than responding to user requests directly, module 105 instead responds to registered client devices 101 of various types, and more specifically to predefined trigger events that occur on those devices 101. These trigger events may be initiated by users 100 of the devices 101, or they may be conditions detected by devices 101 that initiate the event, such as a device 101 being dropped or thrown. In at least one embodiment, a trigger event for a device 101 causes the device 101 to initiate a unidirectional device/server transaction. Then, as described above, trusted agent partitioning module 105 partitions the transaction data (in the form of compound message 111) onto two or more modules (such as public governance module 204 and private governance module 212), based on the trigger event and kind of data the device 101 is capable of transmitting. Trusted agent partitioning module 105 also digitally seals the transaction pieces so that at a later step, private data inquest module 306 can verify and certify the pieces of a transaction that belong together.

In various embodiments, the described system thus facilities the following features and operations, either singly or in any suitable combination:

Automatic partitioning of incoming transaction data onto two or more other modules (such as public governance module 204 and private governance module 212), each with different attributes.

Generation of new server data based on a summary of device transactions and on public summary criteria.

Embedding of digital seals into various summary data to allow other servers to link the data into specific detail server data.

Partitioning of detail data such as metadata, including GPS location, device identifiers, time stamps, and media including, audio, picture, fingerprints, voice signatures, serial numbers, and/or video onto private governance module 212, with digital seals.

Registering of a device 101 and its specific embedded features, so that trusted agent partitioning module 105 can properly decode incoming data transactions.

Registering of the types of trigger events that trusted agent partitioning module 105 should respond to, and how to partition them.

Summary data provided by trusted agent partitioning module 105 to a public or private server that can act as various feedback mechanisms to direct other devices 101 to adjust their capabilities or parameters. For instance certain trigger events can be monitored by other devices 101 while monitoring a public summary server event, causing appropriate action to be taken, such as for example adjusting the field of view in a camera, based on a GPS location.

In at least one embodiment, multiple devices 101 can detect or initiate a trigger event or other condition as a group. Thus, a trigger event or other condition can be detected or initiated based on information collected by two or more devices 101. As an example, near-field communications (such as Bluetooth) can be used to detect other devices in proximity initiating a transaction, or multiple users 100 agreeing to initiate a trigger event as a group using their different devices 101.

In at least one embodiment, the system can provide an audio alert when a trigger event has caused a transaction to be logged. This can act as feedback or a "put on notice" signal.

In at least one embodiment, governing constitution module 108 can be configured as a private data server having an indirect search mechanism. Thus, governing constitution module 108 gathers all of the device data transactions and stores them with digital seals. Module 108 thus prevents the data from being searched by any public means, and provides a governing constitution that specifies under what conditions a search can occur. The actual search occurs as a result of, for example, two or more entity/client interactions, including one providing the request for the type of search and another providing the conditions of permission for the search.

Alarm System Implementation

In at least one embodiment, the described system and method can be used to implement an alarm system wherein data is gathered from various devices and held. Then, in the event of some condition (such as a trigger event or other alarm condition), the platform can reassemble the stored elements of data and make them available to authorized entities.

More particularly, the system can be used to place people on notice that under certain condition(s) (i.e., in response to certain trigger events, such as commission of a crime, or loss of a person or item), detailed information may become available to authorized entities. Such information may include, for example, previous locations of the missing person or item, and/or transactions involving the person or item, or the like. By making such information available under certain predefined condition(s), the system allows authorized entities to determine what happened; this can make it easier, for example, for law enforcement officials to track criminals, and/or otherwise respond in case of occurrence of a trigger event or other condition(s).

In at least one embodiment, the predefined condition(s) can be made public in advance, thereby deterring criminals because they know that their actions will be trackable in the event a crime is committed. The publicly available summary information can further reinforce the notion that information is being collected and tracked.

In at least one embodiment, private information is stored in cloud-based storage, so that it is can be generated and provided to authorized entities even if the device (such as a smartphone) is erased or destroyed.

In at least one embodiment, the device can output a distinctive sound, message, or other output, to reassure the user that the device is protected by the alarm system described herein, and/or to place other interacting parties on notice. For instance, the distinctive sound, message, or other output can serve to indicate that an interaction has been deposited on the platform. In at least one embodiment, the sound (or other output) indicates to the parties that the relevant information is no longer on the local device and cannot be deleted. This creates a deterrent from stealing and/or destroying the device in hope of acquiring or deleting information, since the information is no longer local.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may be a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability. Further, any reference herein to a "device" can alternatively refer to one or more internal subsets of devices.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for implementing an electronic preemptive evidentiary escrow platform, comprising:
    receiving, from a client device, a compound message comprising a public summary data component and a private data component;
    at a processor, consulting a first previously generated database to determine a location and encoding scheme of the public summary data component within the compound message;
    at the processor, extracting the public summary data component from the compound message using the determined location and encoding scheme of the public summary data component;
    at the processor, consulting a second previously generated database to determine a location and encoding scheme of the private data component within the compound message;
    at the processor, extracting the private data component from the compound message using the determined location and encoding scheme of the private data component;
    storing the public summary data component and the private data component at one or more storage devices;
    responsive to a request for the public summary data component, providing the public summary data component;
    responsive to at least one predetermined condition, automatically reconfiguring at least one stored parameter to make the private data component available to at least one authorized entity;
    determining whether an entity is an authorized entity; and
    responsive to the entity being an authorized entity, and responsive to the at least one stored parameter indicating that the private data component is available to the authorized entity, providing the private data component to the authorized entity.

2. The method of claim 1, wherein extracting the private data component from the compound message is performed at a processor of a partitioning module.

3. The method of claim 1, wherein:
    providing the public summary data component comprises outputting the public summary data component at an output device; and
    providing the private data component to the authorized entity comprises outputting the private data component at an output device associated with the authorized entity.

4. The method of claim 1, wherein:
    providing the public summary data component comprises providing a web page comprising the public summary data component; and
    providing the private data component to the authorized entity comprises providing a web page comprising the private data to a device associated with the authorized entity.

5. The method of claim 1, wherein:
    providing the public summary data component comprises transmitting the public summary data component to a client device; and
    providing the private data component to the authorized entity comprises transmitting the private data component to a client device associated with the authorized entity.

6. The method of claim 1, wherein the public summary data component comprises at least one selected from the group consisting of:
    metadata describing a user device involved in a transaction;
    a location of a transaction;
    a time of a transaction; and
    a classification of a transaction.

7. The method of claim 1, wherein the private data component comprises at least one selected from the group consisting of:
    metadata describing a user device involved in a transaction;
    a location of a transaction, wherein such location is specified in greater precision than is specified by the public summary data component;
    a time of a transaction, wherein such time is specified in greater precision than is specified by the public summary data component;
    details of a transaction;
    at least one media item depicting a transaction;
    at least one document describing a transaction; and
    an indication of device information.

8. The method of claim 1, further comprising, prior to making the private data component available to at least one authorized entity, automatically detecting that the at least one predetermined condition has been satisfied.

9. The method of claim 1, further comprising, prior to making the private data component available to at least one authorized entity, receiving user input indicating that the at least one predetermined condition has been satisfied.

10. The method of claim 1, further comprising, prior to making the private data component available to at least one authorized entity, receiving a signal indicating that the at least one predetermined condition has been satisfied.

11. The method of claim 1, wherein the at least one predetermined condition comprises at least one selected from the group consisting of:
    breach of an agreement;
    loss of an item; and
    theft of an item.

12. The method of claim 1, wherein:
    receiving the compound message comprises receiving the compound message via an electronic network;
    storing the public summary data component and the private data component at one or more storage devices comprises storing the public summary data component and the private data component at one or more storage devices communicatively coupled to the electronic network;

providing the public summary data component comprises providing the public summary data via the electronic network;

making the private data component available to at least one authorized entity comprises making the private data component available to the at least one authorized entity via the electronic network; and providing the private data component to the authorized entity comprises providing the private data component to the authorized entity via the electronic network.

13. The method of claim 1, further comprising:
responsive to at least one predetermined condition being satisfied, transmitting an alert to the at least one authorized entity indicating that the private data component is available to the at least one authorized entity.

14. The method of claim 13, wherein the alert comprises a link to provide access to the private data component.

15. The method of claim 1, further comprising:
after storing the public summary data component and the private data component at one or more storage devices, generating output to indicate that the private data component is protected; and
responsive to the at least one predetermined condition, generating output signifying an alarm.

16. The method of claim 1, further comprising:
after storing the public summary data component and the private data component at one or more storage devices, transmitting a notification to indicate that the private data component is protected; and
responsive to the at least one predetermined condition, transmitting a notification signifying an alarm.

17. The method of claim 1, wherein the request for the private data component is received from the client device.

18. The method of claim 1, wherein the request for the private data component is received from a device other than the client device.

19. The method of claim 1, wherein:
storing the private data component comprises transmitting the private data and at least one electronic key to a trusted agent for generation of multiple keys, wherein such keys are all required to unlock the private data; and
automatically reconfiguring at least one stored parameter to make the private data component available to at least one authorized entity comprises the trusted agent receiving the keys and unlocking the private data.

20. The method of claim 1, wherein consulting the second previously generated database to determine the location and encoding scheme of the private data component within the compound message comprises parsing the compound message to identify the location within the compound message where the private data component is contained, wherein another portion of the compound message does not contain the private data component.

21. The method of claim 1, wherein the at least one predetermined condition comprises an unforeseen event.

22. The method of claim 1, wherein the steps of determining whether the entity is an authorized entity and providing the private data component to the authorized entity are performed responsive to a request, from the entity, for the private data component corresponding to the summary data component.

23. The method of claim 1, wherein:
extracting the public summary data component is performed by a public governance module; and
extracting the private data component is performed by a private governance module.

24. A non-transitory computer-readable medium for implementing an electronic preemptive evidentiary escrow platform, comprising instructions stored thereon, that when executed by a processor, perform the steps of:
receiving, from a client device, a compound message comprising a public summary data component and a private data component;
at a processor, consulting a first previously generated database to determine a location and encoding scheme of the public summary data component within the compound message;
at the processor, extracting the public summary data component from the compound message using the determined location and encoding scheme of the public summary data component;
at the processor, consulting a second previously generated database to determine a location and encoding scheme of the private data component within the compound message;
at the processor, extracting the private data component from the compound message using the determined location and encoding scheme of the private data component;
storing the public summary data component and the private data component at one or more storage devices;
responsive to a request for the public summary data component, providing the public summary data component;
responsive to at least one predetermined condition, automatically reconfiguring at least one stored parameter to make the private data component available to at least one authorized entity;
determining whether an entity is an authorized entity; and
responsive to the entity being an authorized entity, and responsive to the at least one stored parameter indicating that the private data component is available to the authorized entity, providing the private data component to the authorized entity.

25. The non-transitory computer-readable medium of claim 24, wherein extracting the private data component from the compound message is performed at a processor of a partitioning module.

26. The non-transitory computer-readable medium of claim 24, wherein:
providing the public summary data component comprises at least one selected from the group consisting of:
causing an output device to output the public summary data component;
providing a web page comprising the public summary data component; and
transmitting the public summary data component to a client device; and
providing the private data component to the authorized entity comprises at least one selected from the group consisting of:
causing an output device associated with the authorized entity to output the private data component;
providing a web page comprising the private data to a device associated with the authorized entity; and
transmitting the private data component to a client device associated with the authorized entity.

27. The non-transitory computer-readable medium of claim 24, wherein the public summary data component comprises at least one selected from the group consisting of:
- metadata describing a user device involved in a transaction;
- a location of a transaction;
- a time of a transaction; and
- a classification of a transaction.

28. The non-transitory computer-readable medium of claim 24, wherein the private data component comprises at least one selected from the group consisting of:
- metadata describing a user device involved in a transaction;
- a location of a transaction, wherein such location is specified in greater precision than is specified by the public summary data component;
- a time of a transaction, wherein such time is specified in greater precision than is specified by the public summary data component;
- details of a transaction;
- at least one media item depicting a transaction;
- at least one document describing a transaction; and
- an indication of device information.

29. The non-transitory computer-readable medium of claim 24, further comprising, prior to making the private data component available to at least one authorized entity, performing at least one selected from the group consisting of:
- automatically detecting that the at least one predetermined condition has been satisfied;
- receiving user input indicating that the at least one predetermined condition has been satisfied; and
- receiving a signal indicating that the at least one predetermined condition has been satisfied.

30. The non-transitory computer-readable medium of claim 24, wherein:
- receiving the compound message comprises receiving the compound message via an electronic network;
- causing one or more storage devices to store the public summary data component and the private data component comprises causing one or more storage devices communicatively coupled to the electronic network to store the public summary data component and the private data component;
- providing the public summary data component comprises providing the public summary data via the electronic network;
- making the private data component available to at least one authorized entity comprises making the private data component available to the at least one authorized entity via the electronic network; and
- providing the private data component to the authorized entity comprises providing the private data component to the authorized entity via the electronic network.

31. The non-transitory computer-readable medium of claim 24, further comprising:
- responsive to at least one predetermined condition being satisfied, transmitting an alert to the at least one authorized entity indicating that the private data component is available to the at least one authorized entity.

32. The non-transitory computer-readable medium of claim 24, wherein consulting the second previously generated database to determine the location and encoding scheme of the private data component within the compound message comprises parsing the compound message to identify the location within the compound message where the private data component is contained, wherein another portion of the compound message does not contain the private data component.

33. The non-transitory computer-readable medium of claim 24, wherein the at least one predetermined condition comprises an unforeseen event.

34. The non-transitory computer-readable medium of claim 24, wherein determining whether the entity is an authorized entity and providing the private data component to the authorized entity are performed responsive to a request, from the entity, for the private data component corresponding to the summary data component.

35. The non-transitory computer-readable medium of claim 24, wherein:
- extracting the public summary data component is performed by a public governance module; and
- extracting the private data component is performed by a private governance module.

36. A system for implementing an electronic preemptive evidentiary escrow platform, comprising:
- a network communication device, configured to receive, from a client device, a compound message comprising a public summary data component and a private data component;
- a processor, communicatively coupled to the network communication device, configured to perform the steps of:
  - consulting a first previously generated database to determine a location and encoding scheme of the public summary data component within the compound message;
  - extracting the public summary data component from the compound message using the determined location and encoding scheme of the public summary data component;
  - consulting a second previously generated database to determine a location and encoding scheme of the private data component within the compound message; and
  - extracting the private data component from the compound message using the determined location and encoding scheme of the private data component; and
- at least one storage device, communicatively coupled to the processor, configured to store the public summary data component and the private data component;
- wherein the processor is further configured to perform the steps of:
  - responsive to a request for the public summary data component, providing the public summary data component;
  - responsive to at least one predetermined condition, automatically reconfiguring at least one stored parameter to make the private data component available to at least one authorized entity;
  - determining whether an entity is an authorized entity; and
  - responsive to the entity being an authorized entity, and responsive to the at least one stored parameter indicating that the private data component is available to the authorized entity, providing the private data component to the authorized entity.

37. The system of claim 36, wherein extracting the private data component from the compound message is performed at a processor of a partitioning module.

38. The system of claim 36, wherein:
- providing the public summary data component comprises at least one selected from the group consisting of:

causing an output device to output the public summary data component;
providing a web page comprising the public summary data component; and
transmitting the public summary data component to a client device; and
providing the private data component to the authorized entity comprises at least one selected from the group consisting of:
causing an output device associated with the authorized entity to output the private data component;
providing a web page comprising the private data to a device associated with the authorized entity; and
transmitting the private data component to a client device associated with the authorized entity.

39. The system of claim 36, wherein the public summary data component comprises at least one selected from the group consisting of:
metadata describing a user device involved in a transaction;
a location of a transaction;
a time of a transaction; and
a classification of a transaction.

40. The system of claim 36, wherein the private data component comprises at least one selected from the group consisting of:
metadata describing a user device involved in a transaction;
a location of a transaction, wherein such location is specified in greater precision than is specified by the public summary data component;
a time of a transaction, wherein such time is specified in greater precision than is specified by the public summary data component;
details of a transaction;
at least one media item depicting a transaction;
at least one document describing a transaction; and
an indication of device information.

41. The system of claim 36, wherein the processor is further configured to, prior to making the private data component available to at least one authorized entity, perform at least one selected from the group consisting of:
automatically detecting that the at least one predetermined condition has been satisfied;
receiving user input indicating that the at least one predetermined condition has been satisfied; and
receiving a signal indicating that the at least one predetermined condition has been satisfied.

42. The system of claim 36, further comprising an electronic network, wherein:
receiving the compound message comprises receiving the compound message via the electronic network;
the at least one storage device comprises at least one storage device communicatively coupled to the electronic network;
providing the public summary data component comprises providing the public summary data via the electronic network;
making the private data component available to at least one authorized entity comprises making the private data component available to the at least one authorized entity via the electronic network; and
providing the private data component to the authorized entity comprises providing the private data component to the authorized entity via the electronic network.

43. The system of claim 36, further comprising:
an alert module, communicatively coupled to the processor, configured to, responsive to at least one predetermined condition being satisfied, transmit an alert to the at least one authorized entity indicating that the private data component is available to the at least one authorized entity.

44. The system of claim 36, wherein consulting the second previously generated database to determine the location and encoding scheme of the private data component within the compound message comprises parsing the compound message to identify the location within the compound message where the private data component is contained, wherein another portion of the compound message does not contain the private data component.

45. The system of claim 36, wherein the at least one predetermined condition comprises an unforeseen event.

46. The system of claim 36, wherein determining whether the entity is an authorized entity and providing the private data component to the authorized entity are performed responsive to a request, from the entity, for the private data component corresponding to the summary data component.

47. The system of claim 36, wherein:
the processor extracts the public summary data component under the direction of a public governance module; and
the processor extracts the private data component under the direction of a private governance module.

* * * * *